United States Patent [19]
Vanderspurt et al.

[11] Patent Number: 4,764,499
[45] Date of Patent: Aug. 16, 1988

[54] METHOD FOR PRODUCING DUAL COLLOID CATALYST COMPOSITION

[75] Inventors: Thomas H. Vanderspurt, E. Amwell Twp.; Michael A. Richard, Fanwood; Tessie M. Che, Westfield, all of N.J.

[73] Assignee: Exxon Research and Engineering Company, Florham Park, N.J.

[21] Appl. No.: 639,438

[22] Filed: Aug. 10, 1984

[51] Int. Cl.[4] .............. B01J 21/08; B01J 31/00; B01J 27/22; B01J 27/24
[52] U.S. Cl. .................. 502/258; 502/164; 502/177; 502/200; 502/243; 502/250; 502/302; 502/313
[58] Field of Search .......... 502/164, 177, 200, 243, 502/250, 258, 302, 313

[56] References Cited

U.S. PATENT DOCUMENTS

| | | | |
|---|---|---|---|
| 3,243,386 | 3/1966 | Nielsen et al. | 502/243 |
| 3,317,438 | 5/1967 | Engebretson et al. | 502/250 X |
| 3,317,439 | 5/1967 | Stiles et al. | 252/455 |
| 3,340,011 | 9/1967 | Hoekstra et al. | 502/250 X |
| 3,551,352 | 12/1970 | Carr et al. | 502/243 X |
| 3,770,658 | 11/1973 | Ozaki et al. | 502/243 X |
| 3,839,225 | 10/1974 | Acres | 502/177 |
| 3,839,229 | 10/1974 | Senes et al. | 252/455 R |
| 4,008,181 | 2/1977 | Dordewola et al. | 502/313 X |
| 4,094,821 | 6/1978 | McVicker et al. | 502/250 X |
| 4,155,928 | 5/1979 | Finch | 502/177 X |
| 4,276,199 | 6/1981 | Hoxmeier | 502/200 X |
| 4,309,311 | 1/1982 | Johnson et al. | 252/438 |
| 4,359,406 | 11/1982 | Fung | 502/200 |
| 4,369,132 | 1/1983 | Kinoshita et al. | 502/302 X |
| 4,415,744 | 11/1983 | Schumacher et al. | 502/250 X |

FOREIGN PATENT DOCUMENTS

| | | |
|---|---|---|
| 998990 | 10/1976 | Canada ............... 252/77 |
| 253122 | 4/1927 | United Kingdom . |
| 247225 | 5/1927 | United Kingdom . |
| 273735 | 10/1928 | United Kingdom . |
| 1515604 | 6/1978 | United Kingdom . |

OTHER PUBLICATIONS

"Effect of the Composition of a Nitrogen-Hydrogen Mixture on the Activity of Ferrocyanide Catalysts for Ammonia Synthesis" by Rakhmat-Zade et al, (1974).
"Activation of Nitrogen by Alkali Metal Promoted Transition Metal I. Ammonia Synthesis over Ruthenium Promoted by Alkali Metal" by Aika et al (1972).
"Catalytic Properties of Montmorillonite-Stabilized Ferrocyanide Catalysts in the Ammonia Synthesis Reaction" by E. Kharchenko et al (1974).
"Synthesis of FeReN(CN)$_4$ H$_2$O and Tests of Its Catalytic Activity in Ammonia Synthesis" by Y. Lyubchenko et al.
"Development of Alkali-Promoted Ruthenium as a Novel Catalyst for Ammonia Synthesis" by A. Ozaki (1981).
"Catalytic Activity of Systems Based on Coordination Cyanides of Copper, Iron, Ruthenium, and Osmium in the Reaction of Ammonio Synthesis" by Tkachenko et al.
"Ruthenium Catalysts for Ammonia Synthesis Prepared by Different Methods" by Ozaki et al.
"Study of the Thermal Dissociation of Prussian Blue" by Zarovnyatnykh et al.
"Ammonia Synthesis with Catalysts Derived from Complex Iron Cyanides" by A. Mittasch.

*Primary Examiner*—Helen M. S. Sneed
*Assistant Examiner*—William G. Wright
*Attorney, Agent, or Firm*—Henry E. Naylor

[57] ABSTRACT

Disclosed is a method for preparing dual colloid catalyst compositions which are suitable for use in such processes as ammonia synthesis, carbon monoxide hydrogenation, hydrogenation and denitrogenation. The method comprises forming a gel, or suspension, by admixing: (i) one or more transition metal cyano-containing anionic-complex solutions wherein at least one solution contains a reducible transition metal, and wherein one or more of these solutions optionally contains a nonreducible metal, with (ii) one or more solutions containing polyvalent metal cations. The resulting gel, or suspension is heated to a temperature of about 90° C. to about 150° C. for an effective amount of time to allow hydrolysis and polymerization to occur. The resulting solid is then filtered and ion exchanged with ions of one or more metals selected from those exchangeable metals from groups IA, IIA, IIIB, IVB, VIB, VIIB, and VIII of the Periodic Table of the Elements. The resulting ion-exchanged material is then dried.

13 Claims, No Drawings

METHOD FOR PRODUCING DUAL COLLOID CATALYST COMPOSITION

FIELD OF THE INVENTION

The present invention relates to a method for preparing dual colloid catalyst compositions which are suitable for use in such processes as ammonia synthesis, carbon monoxide hydrogenation, hydrogenation and denitrogenation. The method comprises forming a gel, or suspension, by admixing: (i) one or more transition metal cyano-containing anionic-complex solutions wherein at least one solution contains at reducible transition metal, and wherein one or more of these solutions optionally contains a nonreducible metal, with (ii) one or more solutions containing polyvalant metal cations. The resulting gel, or suspension is heated to a temperature of about 90° C. to about 150° C. for an effective amount of time to allow hydrolysis and polymerization to occur. The resulting solid is then filtered and ion exchanged with ions of one or more metals selected from those exchangeable metals from groups IA, IIA, IIIB, IVB, VIB, VIIB, and VIII of the Periodic Table of the Elements. The resulting ion-exchanged material is then dried.

BACKGROUND OF THE INVENTION

Because of their almost incalculable value to industrial chemical processes, many catalysts and catalytic processes have been developed over the years. Catalysts, such as heterogeneous catalysts, can generally be classified as either supported metal catalysts or massive metal catalysts, also sometimes referred to as bulk metal catalysts.

Supported metal catalysts are usually comprised of relatively small metal crystallites on relatively large support particles. The support particles may also act as a promoter for the active ingredients of the catalyst. Because the metal crystallites are small compared to the support particles, the effective metal surface area per unit volume of catalyst is relatively small, thus limiting the activity of the catalyst.

In contrast, massive metal catalysts, such as the well known magnetite or spinel-based ammonia synthesis catalysts, or Raney metal type catalysts, generally contain metal domains having dimensions which are usually far greater than any promoter phase particles which may be present. The effective metal surface area per unit volume of such catalysts is also relatively small, thus limiting the potential activity of the catalyst. To maximize the effective catalytically active surface area per unit volume, it would be desirable to produce a catalyst having a median metal crystallite, or domain, size of about 25 Å to about 500 Å in diameter. The desired crystallite size, of course, depends on the intended application. For example, crystallite sizes in the range of 25 Å to 250 Å are desired for catalyzing reactions involving relatively small substrate molecules, while larger crystallites, in the range of 250 Å to 500 Å, are desired for catalyzing reactions involving large substrate molecules. Effective metal surface area per unit volume of catalyst as used herein means metal area accessible to reactants. Because of the demanding nature of certain catalytic reactions (e.g. ammonia synthesis) the surface area of very small metal crystallites may be either ineffective or non-selective.

Although it may be possible to conventionally produce supported metal catalysts containing metal crystallites having a median diameter within the 25 Å to 500 Å range, it can only be done in combination with relatively large support particles or a relatively large pore support, far in excess of the metal crystallite diameter. consequently, the effective metal surface area suffers and a catalyst is produced having less activity then it would otherwise have if the size of the support particles were comparable to the size of the metal crystallites.

Consequently, there is a need in the art for the development of catalysts characterized as being balanced with respect to metal surface area and metal crystallite size. That is, catalysts having improved activity owing to their tendency to maximize the effective surface area per unit volume of catalyst.

SUMMARY OF THE INVENTION

In accordance with the present invention there is provided a method for preparing catalyst precursor compositions which method comprises:

(a) forming a gel or suspension by admixing; (i) one or more transition metal cyano-containing anionic-complex solutions wherein at least one solution contains one or more reducible transition metals selected from the Groups IB, IIB, VIB, VIIB, and VIII of the Periodic Table of the Elements, wherein the cations accompanying the anionic complexes may be one or more alkali metal ions, with (ii) one or more solutions containing metal cations wherein at least one of the metals is a nonreducible metal selected from the group consisting of Cr, Al, Th, U, the lanthanides, and elements of Group IIA of the Periodic Table of the Elements, (b) heating the resulting gel, or suspension, at a temperature of about 90° C. to about 150° C. for an effective amount of time to allow hydrolysis and polymerization to occur, (c) separating the resulting solid precursor, (d) modifying the precursor by ion-exchanging cations of one or more alkali and alkaline-earth metals with cations of one or more metals selected form Groups IA, IIA, IB, IIB, IIIB, IVB, VIB, and VIII of the Periodic Table of the Elements and/or $NH_4^+$ and/or quaternary ammonium anions, and (e) drying the ion-exchanged precursor.

DETAILED DESCRIPTION OF THE INVENTION

The catalyst compositions of the present invention are comprised of about 15 to about 85 wt.% of metal crystallites interspersed with about 15 to about 85 wt.% of promoter particles which compositions are sometimes referred to herein as dual colloid catalysts because the sizes of the metal crystallites and the promoter particles are both of colloid size and are within about an order of magnitude of each other. For example, the size of the metal crystallites are such that at least about 80% will have a diameter, d, between about 25 Å and 500 Å with the proviso that the crystallite size distribution of at least about 80% of these be expressed by the relationship $0.5 < d < 2D$ where D is the median of the diameters of this 80%.

The metal crystallites of the catalysts of the present invention may be comprised of one or more of the following: (a) a single transition metal, (b) two or more metals, including alloys, wherein at least about 50 wt.% of the metal content is one or more transition metals, and (c) one or more reducible transition metal carbides, nitrides, and oxides. The term, reducible, as used herein for the metal crystallites means converted to the metallic state by hydrogen at temperatures up to about 650° C. and at hydrogen pressures up to about 300 atm. where the ratio of hydrogen partial pressure to the partial pressure of water, CH$_4$, and NH$_3$ is at least 1000:1. The transition metal may be selected from those reducible metals from Groups IB, IIB, VIB, VIIB, and VIII of the Periodic Table of the Elements, as illustrated on the inside cover the Handbook of Chemistry and Physics, 55th Edition, CRC Press 1974–1975. Preferred transition metals, especially for use in ammonia synthesis, include Mo, Re, W, Fe, Ru, Os, Co, Rh, and Ni. Of course, the choice of transition metals will depend on the reaction being catalyzed.

X-ray photoelectron spectroscopy of activated catalysts prepared from K$_4$Ru(CN)$_6$ such as materials analogous to those described in examples 5 and 6 hereof showed no evidence of the presence of metallic potassium in the promoter phase which is interspersed with the crystallites of the present invention. The promoter phase is comprised of about 15 to about 85 wt.% of a nonreducible promoter phase interspersed with the metal crystallites and containing at least one element selected from the group consisting of Cr, Mn, Zn, Al, Si, Th, U, the lanthanides, and Groups IA, IIA, IIIB, IVB, and VB of the Periodic Table of the Elements, wherein the promoter phase is comprised of particles of which at least about 80% have a diameter between about 15 Å and 1500 Å wherein the median diameter (D) of the metal crystallites and the median diameter of the 80% of the promoter particles do not differ by more than a factor of about 20.

The nonreducible materials impart improved activity, selectivity, and/or stability to the catalyst. The term, nonreducible material, as used herein for the promoter phase, means a material which is not reduced to the metallic state when subjected to the atmosphere and process conditions under which it will be employed. That is, the particles of the promoter phase are not catalytically active in the sense that the metal crystallites are, although they may perform a different catalytic function than the metal crystallites for any particular reaction. Non-limiting examples of material which may comprise the promoter phase herein include the structural promoters such as the refractory metal oxides, Al$_2$O$_3$, MgO and CaO, metal nitrides, and metal carbides. Also included are electronic promoters such as the oxides, nitrides, amides and hydroxides of metals having a Pauling electronegativity of 1.3 or less.

The promoter phase of the precursor may also contain compounds of the promoter elements, such as halides, carbonates, nitrates, nitrites, phosphates, sulfates, etc. It is preferred that such promoter compounds be chosen such that their anions not give rise to materials which will poison the active catalyst. For example, a precursor containing sulfates would be undesirable for activation and use for ammonia synthesis. The particular material chosen for the promoter phase will primarily depend on the reaction in which it is used. For example, if the promoter is used for a catalyst for ammonia synthesis, it is preferred that the promoter phase be highly basic and include compounds of one or more metals selected from the group consisting of the alkali metals, the alkaline-earth metals, and lanthanum. Of course, the promoter phase of the catalysts of the present invention is not restricted to any particular type of promoter. They may, in fact, function as more than one type, for example, a promoter may serve as both a structural and an electronic promoter, such as MgO.

Individual promoter particles may become indistinguishable through the formation of a more or less continuous network of promoter since the promoter is often amorphous or not very crystalline. In this case the separation between adjacent metal crystallites caused by the promoter phase may vary from about 15 Å to about four times the median diameter of the metal crystallites. The promoter phase may contain alkali, alkaline earth or lanthanide cyanide.

The term "promoter phase" as used herein includes particles of a single composition as well as particles of different compositions.

The metal crystallite phase of the catalyst of the present invention may be represented by $A_aB_bC_cD_dE_eF_fG_g$, and the nonreducible promoter phase may be represented by $H_hI_iJ_jK_kL_lAl_mSi_s$, where:

A is one or more of Fe, Ru, Os and a is from 0 to 4;
B is one or more of Co, Rh, Ir and b is from 0 to 4;
C is one or more of Ni, Pd, Pt and c is from 0 to 4;
D is one or more of Re, Mo, W and d is from 0 to 2;
E is one or more of Mn, Cr and e is from 0 to 0.5;
F is one or more of Cu, Ag, Au and f is from 0 to 2;
G is one or more of Zn, Cd and g is from 0 to 1;

wherein the values of d, e, and g are such that the metals of D, E, and G will be reduced to the metallic or metal alloy state under reducing conditions when in combination with metals of A, B, C, and F in amounts of a, b, c, and f, and wherein the sum $a+b+c+d+e+f+g$ is between 1 and 4, and H is one or more of Be, Mg, Ca, Sr, Ba and h is from 0 to 4;
I is one or more of Li, Na, K, Rb, Cs, and i is from 0 to 4;
J is one or more of Sc, Y, La, Ce, Pr, Nd, Sm, Eu, Gd, Tb, Dy, Ho, Er, Tm, Yb, Lu, Th, U and j is from 0 to 4;
K is one or more of Ti, Zr, Hf, V, Nb, Ta, and k is from 0 to 4;
L is one or more of Cr, Mn, Zn and l is from 0 to 4, where the value of l is such that Cr, Mn, and Zn are not reduced to the metallic or metallic alloy state when in combination with metals of A, B and C in amounts a, b, c under reducing conditions, and m and s are each from 0 to 2, wherein the sum $h+i+j+k+l+m+s$ is between 0.1 and 4.

A preferred class of catalyst compositions of the present invention may be represented by the formula:

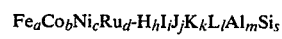

$$Fe_aCo_bNi_cRu_d\text{-}H_hI_iJ_jK_kL_lAl_mSi_s$$

where

H is one or more of Mg, Ca, Sr, Ba and h is from 0 to 2;
I is one or more of Li, Na, K, Rb, Cs and i is from 0.1 to 4;
J is one or more of Y, La, Ce, Eu, Th, U, and the remaining lanthanides and j is from 0 to 3;
K is one or more of Ti, Zr, Hf, Nb, Ta and k is from 0 to 2;
L is Cr and l is from 0 to 2;
a is from 0 to 3, b is from 0 to 0.5, c is from 0 to 0.5, d is from 0 to 3, and m and s are each from 0 to 2.

Preferred species of this class include: (a) b, c, d, j and s each being equal to 0, a being from 1 to 3, i being from 0.1 to 3, m being from 1 to 2, and l being one or more of Na, K, Rb, and Cs; (aa) same as (a) above except h being equal to 0; (b) b, c, d, m and s each being equal to 0, a being from 0.1 to 3, i being from 0.1 to 3, and l being from 0 to 3; (bb) same as (b) above except h being equal to 0; (c) b, c, d, l, m and s each being equal to 0, a being from 1 to 3, i being from 0.1 to 3, j being from 0.1 to 3, and J being one or more of La and Ce; (cc) same as (c) above except h being equal to 0; (d) a, b, c, j and s each beng equal to 0, d being from 1 to 3, i being from 0.1 to 3, m being from 1 to 3, and I being one or more of Na, K, Rb, and Cs; (dd) same as (d) above except h being equal to 0; (e) a, b, c, m and s each being equal to 0, d being from 1 to 3, and i being from 0.1 to 3; (ee) same as (e) above except h being equal to 0; (f) a, b, c, l, m and s each being equal to 0, d being from 1 to 3, j being from 1 to 3, and J being one or more of La and Ce; and (ff) same as (f) above except h being equal to 0.

Another preferred class of catalyst compositions of the present invention may be represented by the formula:

where:

A is one or more of Fe, Ru and a is from 0.01 to 2;
B is Co and b is from 0 to 0.4;
C is Ni and c is from 0 to 0.5;
D is one or more of Mo, W and d is from 0 to 2;
E is Mn and e is from 0 to 0.5;
H is one or more of Mg, Ca, Sr, Ba and h is from 0.2 to 3;
I is one or more of Li, Na, K, Rb, Cs and i is from 0.1 to 3;
J is one or more of La, Ce and j is from 0 to 2.0;
K is one or more of Ti, Zr, Hf, Nb, Ta and k is from 0 to 2;
L is Cr and l is from 0 to 2;
N is one or more of Si, Y and n is from 0.5 to 2.0; and m is 0.5 from to 2.0.

In more preferred species of the above the metal crystallite phase is Fe, alone or in combination with one or more of Co, Ni, Mo, W, or Mn.

Another preferred class of catalyst compositions of the present invention may be represented by:

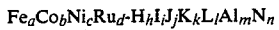

where;

H is one or more of Mg, Ca, Cr, Ba and h is from 0 to 3;
I is one or more of Li, Na, K, Rb, Cs and i is from 0 to 1.0,
J is one or more of La, Ce and j is from 0 to 2.0;
K is one or more of Ti, Nb, Ta, Zr and k is from 0 to 3;
L is one or more of Cr, Mn, Zn and l is from 0 to 3;
N is one or more of Si, Y and n is from 0 to 3;
a, b, c, d and m are from 0 to 3, wherein the sum a+b+c+d=0.5 to 4, and the sum k+l+m+n=0.1 to 4.

The dual colloid catalyst compositions of the present invention are prepared by mixing under sufficient agitation of: (i) one or more transition metal cyano-containing anionic-complex solutions wherein at least one solution contains a reducible transition metal selected from the group consisting of Groups IB, IIB, VIB, VIIB and VIII of the Periodic Table of the Elements and wherein one or more of these solutions optionally contains a nonreducible promoter phase metal, with (ii) one or more solutions containing polyvalent metal cations wherein at least one of the metals is a non-reducible promoter phase metal and wherein one or more of these solutions optionally contains a cationic form of a reducible metal as referred to above. The solutions of (i) and (ii) above must be sufficiently concentrated so as to form a gel or a colloidal suspension, but not too concentrated that an intractable solid will form. It is preferred that the number of ion equivalents of (i) and (ii) be substantially the same. Preferably, the pH of each solution is such that the admixture of the two solutions has a pH of about 3.5 to about 7, more preferably between about 4 to about 7. A preferred way of providing the pH is by adjusting the pH of the second solution (ii) relative to the pH of the first solution (i) to give the desired pH of the admixture. Of course, the final solution may also be adjusted with the appropriate amount of acid or base to the desired pH.

The temperature at which the solutions are mixed is an effective temperature. That is, a temperature not too high that it will adversely affect the morphology of the resulting catalyst precursor and not too low that the solution freezes. Preferably, the solutions are mixed at about room temperature, approximate 20° C. It is to be understood that the term "mixing" may be interchangeable with the term "reacting" because the solutions react with each other immediately when mixed. Consequently, mixing is performed for an effective amount of time, generally no more than a few minutes at about room temperature.

After mixing is completed, the admixture is heated either at atmospheric pressure or in an autoclave at a temperature from about 90° C. to about 150° C. It is convenient to conduct the heating under reflux conditions and it is preferred that the heating be done under an inert atmosphere to prevent excessive contamination of the reacting mixture and to prevent excessive oxidation. Heating is conducted for an effective amount of time to allow hydrolysis and polymerization to occur. By effective amount of time we mean that amount of time required to convert the insoluble, or sparingly soluble, salts of the transition metal cyano-containing anionic-complex to the catalyst precursor. This precursor is comprised of one or more polymeric cyano complexes which on activation give rise to the active phase, and one or more hydrous oxide or polymeric hydroxide phases which on activation give rise to the promoter phase. Generally, the amount of time will be from about 10 to about 100 hours, preferably from about 15 to about 50 hours.

During heating, as the reaction proceeds, the pH of the mixture may change, usually becoming more basic. The pH may be adjusted: (a) by the addition of acid or (b) by the addition of acidic components such as metal salt solutions. During precursor formation and when an acidic pH is no longer needed, basic components such as Si or Nb, in the form of soluble silicates, niobates etc., may be added. The precursor formation reaction sequence can be followed by obtaining infrared spectra or X-ray powder diffraction patterns of the solid material.

After heating is completed, the suspension may be optionally mixed with another collodial suspension containing one or more of the following non-limiting materials: $SiO_2$, $Y_2O_3$, $Al_2O_3$ or with a slurry of a more traditional support such as gamma $Al_2O_3$, etc. If a slurry of conventional support is used the resulting catalyst is a supported dual colloid catalyst and the dimensions set forth herein to describe the promoter phase of the catalyst compositions hereof do not apply to the added traditional support material.

Furthermore, the solids are recovered from the suspension by filtration or centrifugation/decantation. The resulting solid material may be washed by resuspension to remove soluble salts formed during the precursor reaction sequence.

The resulting moist solid is formed, such as by extrusion before drying or dried and formed by pelletizing. It is preferred to dry the material at a temperature from about 50° C. to 150° C. in the absence of air.

It is within the scope of this invention that additional metal and promoter species be introduced onto the precursor by methods such as by impregnation. Non-limiting examples of such species include: $ReO_4^-$, $MoO_4^{-2}$ and $WO_4^{-2}$.

The compositions of the cyano-complex prepared precursors are modified by exchange with solutions containing various mono, di or tripositive cations, and in some cases with anions, for instance $MoO_4^-$, are also incorporated into the precursor composition after ion exchange. The exchange pattern followed by these cyano-complex materials differs from that expected for typical ion exchange materials.

Both alkali and alkaline-earth metal ions present in the solid may be exchanged to some extent by any suitable ions depending on the intended use of the resulting catalyst. Non-limiting examples of such ions include: $Li^+$, $Na^+$, $K^+$, $Rb^+$, $Cs^+$, $NH_4^+$, $Ag^+$, $Mg^{+2}$, $Ca^{+2}$, $Sr^{+2}$, $Ba^{+2}$, $La^{+3}$, $Ce^{+3}$, $Eu^{+3}$, and $ZrO^{+2}$. These ions are contained in solutions having a preferred molarity of about 0.1 to 2.0 except where solubility limitations create an exception. The temperature of exchange can be from 0° C. to the boiling point of the solution with 20° C. to 60° C. preferred.

This ion-exchange procedure is conducted for the purpose of preparing improved catalysts for certain processes. For example, an ammonia synthesis catalyst comprised of FeCo-KAlMg was improved by partially ion exchanging $NH_4^+$ for $K^+$ and $Ca^{+2}$ for $Mg^{+2}$. This resulted in improved stability and greater volumetric activity.

When the catalyst composition is to be used in such processes as ammonia synthesis or hydrogenation it must be activated by reduction. This is preferably done by maintaining it at a temperature of about 150° C. at a space velocity of greater than 5000 v/v/hr for a few minutes to several hours. The pressure is then increased preferably to about 1 mPa to 10 mPa, if it is not already at such a pressure, and the temperature is increased (at a rate of about 1° to 30° C. per hour) to about 315° C. to about 360° C., and holding it at that temperature until activation is complete. This can take from several hours to several days. In some cases additional slow heating to about 500° C. may be required, for example, when more difficult to reduce metals are present or where reduction of metal oxides is involved. The temperature, pressure, and gas hourly space velocity may then be adjusted to the desired operating conditions for the catalytic reaction. Further heating to operating conditions should be in a moderately (<1° C./min.) controlled manner. Heating the material too rapidly to a high temperature of, e.g., 400° C. or more, without a sufficient exposure to moderate temperatures of, e.g., 150° C. to 360° C., will result in a material having poor catalytic activity for ammonia synthesis. The optimum reduction conditions, i.e, temperature, pressure, space velocity and heating rate, will depend on the catalyst composition and its intended use. The best temperature program for a given dual colloid catalyst of the present invention can often be determined by thermogravimetric analysis and high pressure thermogravimetric analysis tests. Such tests are well known to those skilled in the art and will not be discussed in detail herein.

The active catalyst may be used in the ammonia synthesis reaction directly without removal from the activation reactor. Alternatively, the activated and stabilized catalyst may be removed from the activation reactor and charged, or pelletized and charged, into a different reactor for use. This may be advantageous because activation of the composition generally results in approximately a 10 to 50% decrease in volume. Non-limiting examples of types of ammonia synthesis reactors which may be employed herein include vertical, horizontal, or radial-flow types which utilize the catalyst as a fixed bed, fluid bed, or the like.

The ammonia synthesis reaction herein is conducted according to procedures well known to those skilled in the art. Thus, nitrogen and hydrogen are passed over the catalyst at elevated temperatures and pressures sufficient to convert at least a portion of the nitrogen and hydrogen to ammonia.

The gaseous mixture of hydrogen and nitrogen which is introduced into the reactor preferably contains hydrogen and nitrogen in a volume ratio of 1:3 to 10:1, respectively, more preferably 1:1 to 4:1. Most preferred, however, is about a stoichiometric volume ratio of 3:1, except in the case of certain ruthenium-containing catalysts for which a nitrogen-rich feed gas is preferred.

The space velocity of the gaseous mixture of nitrogen and hydrogen expressed as volumes of gas at standard conditions per unit volume of catalyst per hour (GHSV), may range from about 1000 to 100,000 v/v/hr or more, depending on the reactor design. Preferred is about 5000 to about 60,000 v/v/hr.

The pressure of the gaseous feedstream for ammonia synthesis will generally be in the range of 0.1 to 30 MPa, preferably, from about 4 to 20 MPa.

For ammonia synthesis at high temperatures (>350° C.) catalysts containing less than 7 wt.% potassium are preferred.

Highly active dual colloid catalysts usually require that the gas used in ammonia synthesis contain less than 5 ppm, preferably less than 1 ppm, $H_2O$, CO, $CO_2$, or $O_2$ and be essentially free of sulfur containing compounds. High levels of impurities cause decreased catalyst life.

The ammonia in the product stream may be collected, separated, and purified by any methods known in the art for ammonia recovery.

The compositions herein, both precursor and activated catalyst, may also be used in CO hydrogenation wherein carbon monoxide and hydrogen are contacted with the compositions at elevated temperatures and under conditions sufficient to convert at least a portion of the carbon monoxide and hydrogen to hydrocarbons such as methane, ethane, propane, propylene, and the like, as well as oxygenates such as methanol, ethanol, propanol and the like. When the compositions are used for CO hydrogenation the transition metals of the compositions need not be in the metallic state. The practitioner skilled in the art of CO hydrogenation will know the conventional conditions under which such reactions may be catalyzed, and all such conditions are applicable herein. One patent describing a technique which may be used for this purpose is U.S. Pat. No. 2,735,362 which is incorporated herein by reference.

The following examples serve to more fully describe the manner of making and using the above-described invention, as well as to set forth the best modes contemplated for carrying out various aspects of the invention. It is understood that these examples in no way serve to limit the true scope of this invention, but rather, are presented for illustrative purposes.

EXAMPLE 1

(Comparative)

Catalyst A was prepared in accordance with the teachings of U.K. Pat. Nos. 253,122 and 273,735 to Uhde. Specifically, the composition was prepared as follows: A solution containing 66.7 g $AlCl_3$ dissolved in 500 ml $H_2O$ was rapidly mixed with a solution containing 211.8 g $K_4Fe(CN)_6.3H_2O$ dissolved in 1000 ml $H_2O$. The resulting suspension had a pH of about 5.0 to 5.5 and began to gel almost immediately. It was transferred to a 2 liter flask and heated in an oil bath, to a temperature of about 80° C. Under the application of a slight vacuum, water removal began. The vacuum was gradually increased to about $10^{-3}$ torr as the viscous gel dried. This procedure took about six hours. The resulting pale greenish yellow solid catalyst precursor was cooled under vacuum. It turned blue upon exposure to air. A sample of this precursor was activated under 75% $H_2/25\%$ $N_2$ at a gas hourly space velocity of 5000. The reactor temperature was increased from room temperature (25° C.) to 70° C., and then at to 150° C. at 99° C./hr. After about 15 minutes at this temperature, the pressure was increased to 4.2 MPa and a 12° C./hr upramp to 390° C. was started.

After several hours at about 390° C., a representative sample of the activated catalyst was examined by high resolution electron microscopy (HREM). Large rod-like structures, some 1600 Å wide by 5000 to 10,000 Å long, with possibly a laminar structure, were observed. Mixed with these rod-like structures were irregular regions, about 800 Å to 3000 Å across when seen at 125,000 magnification. At 700,000 magnification some of these were seen to be porous with about 100 Å to 400 Å pores. These appeared to be free of metallic particles. Other irregular regions contained numerous, relatively large Fe particles ranging in size from about 300 Å to 900 Å with most being between about 400 Å and 600 Å. Only about 10 to 20% of the large irregular regions were made up of about 120 Å to 400 Å metal crystallites interspersed with similar sized non-metallic particles. Thus, most of the metal appeared to be in particles greater than 300 Å in size. Elemental analysis of the activated catalyst revealed that it had the following composition (wt.%): Fe 13.84, Co 0.073, K 26.49, Al 5.15, Cl 19.59, C 3.63, H 0.43, N 5.00, with less than 50 ppm S. The nitrogen BET surface area of this activated catalyst was about 30 m²/g with a pore volume of 0.06 cm³/g.

This example demonstrates that a conventional catalyst prepared by a conventional potassium ferrocyanide-aluminum chloride process route does not produce catalyst compositions of the present invention, which are comprised of a dual colloid structure.

EXAMPLE 2

(Comparative)

Catalyst B was prepared as follows:

A catalyst precursor composition was prepared according to the procedure of Example 1 hereof except a solution containing 187.67 g $Al(NO_3)_3.9H_2O$ in 500 ml $H_2O$ was used instead of the $AlCl_3$ solution. The resulting suspension had a pH of about 3 to 3.5.

After activating a portion of this material in accordance with the activation procedure of Example 1 hereof, it was examined by HREM and it was found to be made up of primarily two types of regions. The most prevalent region was one having substantially circular or spherical porous domains "necked" together and having particles in the size range of about 400 Å to 4000 Å. These domains had an internal porosity with most pores being of the order of about 100 Å. In some of these porous spheres, particles having a size of approximately 20 Å were found. The second type of region, which comprised only about a third of the catalyst, contained metallic crystallites, most of which were imbedded in promoter particles. On average, these metal crystallites ranged in size from about 40 Å to 1000 Å along at least one dimension. The majority of these metal crystallites appeared to be between about 200 Å and 400 Å in diameter. The nitrogen BET surface area of the activated catalyst was about 9 m²/g with a pore volume of 0.075 cm³/g.

This example demonstrates that even when the preferred reagent, aluminum nitrate, is substituted for aluminum chloride of Example 1, the resulting catalyst composition is still not within the scope of the composition of the present invention. In fact, it was surprising that the compositions of this example had a substantially lower surface area than the compositions of Example 1. This was probably because most of the metal crystallites were engulfed in promoter particles.

EXAMPLE 3

Catalyst C was prepared as follows:

A portion of the suspension of Example 2 hereof was diluted with an equal volume of water and refluxed for 40 hours under nitrogen. After cooling, the refluxed material was filtered and washed twice by repeating the sequence of resuspending the moist filter cake in 500 ml $H_2O$ and filtering. The washed material was dried at reduced pressure at 50° C. overnight then crushed and sieved.

A sample of this material was activated as in Example 1 hereof and examined by HREM where it was observed that 90% or more of the metal crystallites and promoter particles had a particle size between about 40 Å and 100 Å in diameter with less than one particle in 500 having a diameter greater than about 200 Å.

The resulting catalyst had a nitrogen BET surface area of about 110 M²/g and a pore volume of 0.46 cm³/g.

This example demonstrates the importance of a heating step, such as refluxing, for preparing the catalyst compositions of the present invention.

EXAMPLE 4

Catalyst D was prepared as follows:

A solution of 30.0 g $Al(NO_3)_3.9H_2O$, 20 g $Mg(NO_3)_2.6H_2O$ and 5.6 g $Co(NO_3)_2.6H_2O$ in 300 ml $H_2O$ was rapidly mixed with 200 ml of $H_2O$ with the simultaneous addition of a solution of 66.8 g $K_4Fe(CN)_6.3H_2O$ in 300 ml of $H_2O$. The resulting green mixture, which had a pH of about 4.0 to 4.5, was refluxed for 40 hr under nitrogen. It was then cooled and filtered. The moist filter cake was washed twice with doubly distilled water and dried overnight at reduced pressure at 50° C. The dried material was then crushed and sieved.

A sample of this material was activated according to Example 1 hereof and was examined by HREM which showed, as in the above example, that 90% or more of the metal crystallites and promoter particles had a particle size between about 40 Å and 100 Å in diameter with less than one particle in 500 having a dimension greater than about 200 Å. This was confirmed by powder X-ray diffraction. Elemental analysis revealed that the active catalyst had the following composition (wt.%): Fe 28.71, Co 3.81, K 14.39, Mg 4.78, Al 6.97, C 4.54, H 0.39, N 8.9, with about 0.1% Cl and less than 42 ppm S. The empirical formula of the active catalyst was $Fe_{2.0}Co_{0.25}K_{1.46}Mg_{0.78}Al_{1.03}C_{2.6}H_{1.55}N_{2.53}O_x$. The BET surface area of the activated catalyst after use was 216 m$^3$/g with a pore volume of 0.93 cm$^3$/g.

This example also illustrates a dual colloid catalyst composition of the present invention.

EXAMPLE 5

Catalyst E was prepared as follows:

A portion of the filter cake from Example 4 hereof was redispersed in 500 ml 0.1N $NH_4NO_3$ solution and filtered, then redispersed in 500 ml 0.1M $Ca(NO_3)_2$ solution, filtered, then washed with about 200 ml distilled water and dried overnight at reduced pressre at 50° C. The dried material was then crushed and sieved and a portion of a 20–80 mesh fraction was activated in accordance with the activation procedure of Example 1 hereof. The activated material was examined by HREM and was found to have a structure similar to that of the material of Example 3 hereof.

After activation in accordance with the procedure of Example 1 hereof, the elemental composition was (wt.%): Fe 35.05, Co 4.81, K 5.63, Al 9.71, Mg 2.63, Ca 0.96, C 0.80, H 1.04, N 2.80, Cl<0.005, and S<0.002.

The emperical formula of the active catalyst was $Fe_{2.0}Co_{0.25}K_{0.46}Mg_{0.34}Ca_{0.07}Al_{1.15}C_{0.21}N_{0.64}H_{3.28}O_x$.

This example illustrates that the level of K may be decreased and Ca introduced by ion-exchange.

EXAMPLE 6

Catalyst F was prepared as follows:

A solution of 30.0 g $Al(NO_3)_3.9H_2O$, 18.4 g $Ca(NO_3)_2.4H_2O$ and 5.6 g $Co(NO_3)_2.6H_2O$ in 300 ml $H_2O$ and a solution of 66.8 g $K_4Fe(CN)_6.3H_2O$ in 300 ml $H_2O$ were simultaneously added to 200 ml $H_2O$ with rapid mixing. The resultant green mixture had a pH of 4.0 to 4.5 and was refluxed under $N_2$ for 40 hours. It was cooled under $N_2$ and filtered. The resulting moist filter cake was divided into two approximately equal portions. The first portion was washed twice with doubly distilled water by resuspension and filtering and the other portion was used for preparing catalyst G of Example 7 hereof. The final filter cake was dried overnight in vacuum oven at 50° C. then crushed and sieved.

After activation in accordance with the procedure of Example 1 hereof this catalyst was also examined by HREM and was found to hve a structure similar to that of Example 3 hereof.

EXAMPLE 7

Catalyst G was prepared as follows:

A portion of the filter cake from Example 6 hereof was resuspended in 500 ml $NH_4NO_3$ solution and gently stirred overnight. The solution was filtered and the resulting moist filter cake was resuspended in 200 ml $H_2O$, filtered, and the final filter cake dried overnight in a vacuum oven at about 50° C. The dried precursor was crushed and sieved and a 20 to 80 mesh fraction was activated in accordance with Example 1 hereof and examined by HREM.

EXAMPLE 8

A catalyst precursor was prepared as follows:

Solution A, having a pH of 3 was prepared by dissolving 90 g $Al(NO_3)_3.9H_2O$, 60 g $Mg(NO_3)_2.6H_2O$, and 8.2 g $Co(NO_3)_2.6H_2O$ in 450 ml $H_2O$.

Solution B, having a pH of 6.5 was prepared by dissolving 200.4 g $K_4Fe(CN)_6.3H_2O$ om 900 ml $H_2O$.

Solutions A and B were simultaneously added to 1200 ml of $H_2O$ and were ultrasonically mixed at 25° C. The resulting green suspension had a pH of about 4.5 and turned olive green within minutes. The suspension was refluxed whereupon it turned a lighter green. After about 30 hours at refluxing under nitrogen, the suspension was cooled to about room temperature and filtered whereupon 700 g of catalyst precursor was recovered.

A 97.5 g portion of this precursor was treated so as to simulate ion-exchange by suspending it in 855 ml $H_2O$ overnight. It was recovered by filtration, resuspended in another 855 ml $H_2O$ overnight, recovered again by filtration, and dried overnight at 50° C. under reduced pressure. The empirical formula of this material is formed in Table I below.

EXAMPLES 9–16

Samples of the moist precursor from Example 8 were ion-exchanged by suspending them in about 9 ml of 0.1M salt solution per gram of precursor, stirring overnight, recovering the treated precursor by filtration, suspending a second time in aout 9 ml 0.1M salt solution per gram of precursor, stirring overnight, recovering the treated precursor, and finally washing the precursor. The salt of the solution used for ion-exchange for each example is set forth in Table I below as well as the empirical formula of each to show the effect of ion-exchange.

TABLE I

| | | Empirical Formula of Precursor | | | | | | | | | |
|---|---|---|---|---|---|---|---|---|---|---|---|
| Example | Exchanging Salt | Fe | Co | K | Mg | Al | Element Added | C | H | N | Precursor of Catalyst |
| | (water) | 2.00 | 0.14 | 3.13 | 0.99 | 1.16 | — | 10.74 | 7.78 | 10.52 | |
| 9 | $Rb_2CO_3$ | 2.00 | 0.13 | 1.32 | 1.06 | 1.10 | Rb(1.50) | 10.38 | 8.83 | 10.10 | H |
| 10 | $AgNO_3$ | 2.00 | 0.08 | 0.69 | 0.33 | 0.96 | Ag(0.02) | 11.09 | 4.70 | 11.31 | I |
| 11 | $NaNO_3$ | 2.00 | 0.15 | 2.35 | 0.95 | 1.30 | Na(0.14) | 10.57 | 7.77 | 10.87 | J |
| 12 | $Ca(NO_3)_2$ | 2.00 | 0.15 | 2.32 | 1.06 | 1.25 | Ca(0.11) | 10.58 | 8.15 | 10.80 | K |
| 13 | $Ce(NO_3)_3$ | 2.00 | 0.12 | 1.35 | 0.56 | 0.96 | Ce(0.55) | 10.44 | 10.79 | 10.89 | L |
| 14 | $La(NO_3)_3$ | 2.00 | 0.13 | 1.36 | 0.62 | 1.00 | La(0.20) | 10.53 | 12.05 | 12.74 | M |
| 15 | $(NH_4)_2MoO_4$ | 2.00 | 0.16 | 0.52 | 0.96 | 1.24 | Mo(0.02) | 10.20 | 16.19 | 12.12 | N |

TABLE I-continued

| | | Empirical Formula of Precursor | | | | | | | | | |
|---|---|---|---|---|---|---|---|---|---|---|---|
| Example | Exchanging Salt | Fe | Co | K | Mg | Al | Element Added | C | H | N | Precursor of Catalyst |
| 16 | ZrO(NO3)2 | 2.00 | 0.12 | 1.12 | 0.61 | 0.83 | Zr(0.64) | 10.31 | 13.73 | 10.94 | O |

EXAMPLES 17-24

The catalyst precursor of examples 9-16 above were activated in accordance with the procedure of example 1 hereof and used for ammonia synthesis. Conditions for, and the results of, the ammonia synthesis reaction for each active catalyst are shown in Table II below.

TABLE II

| Example | Catalyst | Inlet H2/N2 | Space[1] Velocity | Temp. (°C.) | Press. (MPa) | % NH3 | STY[2] |
|---|---|---|---|---|---|---|---|
| 17 | H | 3.17 | 8500 | 405 | 4.21 | 10.2 | 980 |
| 18 | I | 3.0 | 8900 | 411 | 4.2 | 4.3 | 290 |
| 19 | J | 3.0 | 11300 | 424 | 4.15 | 10.0 | 850 |
| 20 | K | 3.7 | 20,000 | 416 | 4.0 | 9.2 | 1400 |
| 21 | L | 3.0 | 8900 | 406 | 4.2 | 7.1 | 480 |
| 22 | M | 3.0 | 8600 | 419 | 4.2 | 8.4 | 540 |
| 23 | N | 3.0 | 9100 | 420 | 4.2 | 8.8 | 600 |
| 24 | O | 3.0 | 8700 | 413 | 4.3 | 7.8 | 520 |

[1]Space velocity = GHSV = Gas Hourly Space Velocity
[2]STY = Space Time Yield (gNH3/liter cat./hr.)

EXAMPLES 25-59

Dual colloid catalysts containing the elements set forth in Table II below for the active phase and the promoter phase were prepared by any one of three methods:

(1) Direct cyano-complex method of Example 4; (2) the cyano complex-ion exchange method of Example 8; (3) the addition of a colloidal suspension of a promoter element oxide or hydrous oxide to a suspension of cyano-complex precursor as prepared in accordance with Example 4; or (4) adding a preformed solid or slurry.

All of these catalysts were found to be active for ammonia synthesis.

TABLE III

| Example | Active Phase | Elements Promoter Phase | Method |
|---|---|---|---|
| 25 | FeCoRu | KMgAl | 1 |
| 26 | FeNi | KAlMgSr | 2 |
| 27 | FeNi | KAlMg | 1 |
| 28 | RhRu | KAlMgBa | 1 |
| 29 | FeRh | KAlMgBa | 1 |
| 30 | FeCoRe | KAlMg | 2 |
| 31 | FeCoMo | KAlMg | 1 |
| 32 | FeCoNi | KMgAl | 1 |
| 33 | FeCo | KMgCr | 1 |
| 34 | FeCoW | KAlMgSi | 1 |
| 35 | FeMn | KAlMg | 1 |
| 36 | FeCo | SrMgAl | 1 |
| 37 | FeCoW | KAlMg | 2 |
| 38 | FeCo | KalMgSi | 3 |
| 39 | FeCo | KAlMgBa | 1 |
| 40 | FeMo | KAl | 1 |
| 41 | FeRuRe | KAl | 1 |
| 42 | FeRu | KCe | 1 |
| 43 | FeRu | KAl/MgSi | 4 |
| 44 | FeCo | KAlMgCr | 1 |
| 45 | FeCo | KLiAlMg | 1 |
| 46 | FeCo | KMgAlSi | 1 |
| 47 | FeCo | KAlMgBa | 2 |
| 48 | FeCo | KAlMgSr | 2 |
| 49 | FeCo | KMgAlEu | 1 |
| 50 | FeCo | KMgAlLa | 1 |
| 51 | FeCo | KMgAlCe | 1 |
| 52 | FeCo | KMgAlSr | 1 |
| 53 | FeCo | KSrAl | 1 |
| 54 | FeCo | KCsMgAl | 1 |
| 55 | FeCo | KCsMgAlSr | 2 |
| 56 | FeCo | KMgSrBaAl | 2 |
| 57 | FeCo | KMgAlBa | 2 |

The following were prepared and activated similar to that in Example 4 but with In(NO3)3 or Ga(NO3)3 replacing Al(NO3)3 and were found to be inactive for NH3 synthesis:

| 58 | FeCoIn | KMg | 1 |
| 59 | FeCoGa | KMg | 1 |

EXAMPLE 60

A catalyst precursor with the emperical formula Fe 1.7, Co 0.11, K 0.69, Mg 0.67, Al 1.0, C 8.46, H 26.85, O 15.95 was prepared in a manner similar to Catalyst D, Example 4, but with ion-exchange with 234 g NH4NO3 in 200 mls of water, repeated twice to reduce the potassium level. It was activated then treated with 1CO/1H2 at 0.9 Mpa, 220° C. for 12 hours, 230° C. for 24 hours and 240° C. for 12 hours. This was followed by 8 hours at 400° C. under 3H2/1N2. The temperature was then reduced to 220° C. under 1CO/1H2 at 500 GHSV 0.9 Mpa. After 12 hours under these conditions the catalyst gave 47% CO conversion with 48% selectivity to $CO_2$ and 52% selectivity to hydrocarbon products. On a molar carbon basis the distribution of the hydrocarbon fraction as as follows: 5.7% $CH_4$, 3.2% $C_2H_6$, 5.5% $C_2H_4$, 2.8% $C_3H_8$, 5.1% $C_3H_6$, 3.3% $C_4H_{10}$, and 7.6% $C_4H_8$ with 66.8% $C_5+$ and oxygenated products.

What is claimed is:

1. A method for preparing catalyst compositions which method comprises:

(a) forming a gel or suspension by admixing (i) one or more transition metal cyano-containing anionic-complex solutions wherein at least one solution contains one or more reducible transition metals selected from the Groups IB, IIB, VIB, VIIB, and VII of the Periodic Table of the Elements, wherein the cations accompanying the anionic complexes contain one or more alkali metal ions, with (ii) one or more solutions containing metal cations wherein at least one of the metals is a nonreducible metal selected from the group consisting of Cr, Al, Th, U, the lanthanides, and elements of Group IIA of the Periodic Table of the Elements;

(b) heating the resulting gel, or suspension, under reflux conditions, to a temperature of about 90° C.

to about 150° C. for an effective amount of time to allow hydrolysis and polymerization to occur;
(c) separating the resulting solid;
(d) modifying the resulting solid by ion-exchanging cations of one or more alkali and alkaline-earth metals with cations of one or more metals selected from Groups IA, IIA, IB, IIB, IIB, IVB, and VIII of the Periodic Table of the Elements; $NH_4^+$ or quarternary ammonium cations;
(e) drying the ion-exchanged resulting solid; and
(f) heating it at less than 1° C./minute to between about 315° C. and 500° C. in a hydrogen-containing atmosphere and holding it at that temperature for an effective amount of time, thereby resulting in an active catalyst characterized as comprising:
(A) from about 15 to about 85 wt.% of crystallites selected from the group consisting of (i) crystallites of one or more transition metals and (ii) crystallites of reducible transition metal carbides, nitrides, and oxides, and mixtures thereof, said transition metal being selected from those reducible metals from Groups IB, IIB, VIB, VIIB, and VIII of the Periodic Table of the Elements, wherein at least 80% of the crystallites have a diameter, d, between about 25 Å and 500 Å with the proviso that the crystallite size distribution of at least about 80% of these be expressed by the relationship $0.5D < d < 2D$ where D is the median of the diameters of this 80%; and
(B) from about 15 to about 85 wt.% of an amorphous nonreducible promoter phase interspersed with the metal crystallites, and containing compounds of at least one element selected from the group consisting of Cr, Al, Si, Th, U, the lanthanides and Group IA, IIA, IIB, IVB, and VB of the Periodic Table of the Elements, wherein the promoter phase is comprised of particles of which at least about 80% have a diameter between about 15 Å and 1500 Å wherein the median diameter (D) of the metal crystallites and the median diameter of the 80% of the promoter particles do not differ by more than a factor of about 20.

2. The method of claim 1 wherein the transition metals are selected from the group consisting of Fe, Co, Ni, and Ru and the nonreducible promoter phase elements are selected from the group consisting of Mg, Ca, Sr, Ba, Li, Na, K, Rb, Cs, Y, La, Ce, Eu, Th, U, the remaining lanthanides, Ti, Zr, Hf, Nb, Ta, Cr, Al and Si.

3. The method of claim 1 wherein one or both of Al and Si are present as promoter phase elements.

4. The method of claim 2 wherein the transition metals are selected from the group consisting of Fe, Ru, Co, Ni, Mo, W, and Mn and the nonreducible promoter phase elements are selected from the group consisting of Mg, Ca, Sr, Ba, Li, Na, K, Rb, Cs, La, Ce, Ti, Zr, Hf, Nb, Ta, Zr, Si and Y.

5. The method of claim 4 wherein the transition metals are Fe and Co.

6. The method of claim 4 wherein the transition metals are Fe and Ni.

7. The method of claim 4 wherein the transition metals are Fe, Mo, and W.

8. The method of claim 4 wherein the transition metals are Fe and Ru.

9. The method of claim 4 wherein the transition metal is Fe.

10. The method of claim 4 wherein the transition metal is Ru.

11. The method of claim 1 wherein a silicate or a niobate is added during step (a).

12. The method of claim 1 wherein a colloidal suspension containing one or more of $SiO_2$, $Y_2O_3$, and $Al_2O_3$ is added after the heating step of (b).

13. The method of claim 1 wherein a silicate or niobate is added during step (b).

* * * * *